(12) United States Patent
Navabi

(10) Patent No.: US 11,002,436 B2
(45) Date of Patent: May 11, 2021

(54) WINGED LIGHT

(71) Applicant: L.J. Star Incorporated, Twinsburg, OH (US)

(72) Inventor: Aarash Navabi, Walpole, MA (US)

(73) Assignee: L.J. Star, Incorporated, Twinsburg, OH (US)

( * ) Notice: Subject to any disclaimer, the term of this patent is extended or adjusted under 35 U.S.C. 154(b) by 0 days.

(21) Appl. No.: 16/382,577

(22) Filed: Apr. 12, 2019

(65) Prior Publication Data

US 2019/0331325 A1 Oct. 31, 2019

Related U.S. Application Data

(60) Provisional application No. 62/664,660, filed on Apr. 30, 2018.

(51) Int. Cl.
*F21V 21/08* (2006.01)
*F21V 15/01* (2006.01)

(52) U.S. Cl.
CPC .............. *F21V 21/08* (2013.01); *F21V 15/01* (2013.01)

(58) Field of Classification Search
CPC ................................. F21V 21/08; F21V 15/01
See application file for complete search history.

(56) References Cited

U.S. PATENT DOCUMENTS

| | | | | |
|---|---|---|---|---|
| 5,078,467 A | * | 1/1992 | Blomgren | G02B 6/3806 385/56 |
| 5,713,658 A | * | 2/1998 | Stranagan, Jr. | F21L 15/14 248/215 |
| 6,523,986 B1 | * | 2/2003 | Hoffmann | E04F 19/02 362/153 |
| 6,625,372 B1 | * | 9/2003 | Flanders | G02B 6/32 385/134 |
| 9,766,385 B2 | * | 9/2017 | Boonekamp | F21V 13/02 |
| 2004/0076003 A1 | * | 4/2004 | Collura | F21V 33/00 362/234 |
| 2016/0124135 A1 | * | 5/2016 | Durkee | F21S 8/061 362/619 |
| 2016/0183778 A1 | * | 6/2016 | Nadershahi | A61B 1/00128 600/222 |

* cited by examiner

*Primary Examiner* — Jong-Suk (James) Lee
*Assistant Examiner* — Christopher E Dunay
(74) *Attorney, Agent, or Firm* — Edwin A. Sisson, Attorney at Law, LLC; Jeffrey J. Banyas

(57) ABSTRACT

It is described herein an article of manufacture comprising a housing, with a wing shaped support attached to the housing's outer surface in a first direction, and a second wing attached to and extending from the housing outer surface in a second direction opposite the first direction. The first wing and the second wing may have a degree of curvature which can be formed by the respective wing that is greater than 12° for a one inch arc length. The housing may be capable of passing light in a visible wavelength from a cavity in the housing when a light source is disposed within said cavity.

18 Claims, 8 Drawing Sheets

ವುNGED LIGHT

CROSS REFERENCES AND PRIORITIES

This application claims priority from U.S. Provisional Application No. 62/664,660 filed on 30 Apr. 2019, the teachings of which are incorporated herein by reference in their entirety.

BACKGROUND

Equipment used in chemical, pharmaceutical, oil and gas, mining, food and beverage production, and related manufacturing industries often require visual flow indicators or sight flow indicators to allow an operator to visually observe and monitor the flowing fluid. Such devices frequently require illumination from a light source to allow the operator to see through the visual flow indicator or sight flow indicator.

This can be as simple as putting a flashlight behind a transparent pipe. The limitation of the "simple flashlight" is variable intensity and the introduction of background light and visual interference from background light.

Many solutions have been proposed for illuminating a visual flow indicator or sight flow indicator. The simplest solution is to manufacture the visual flow indicator or sight flow indicator with an integral light source. Such light sources cannot be moved to illuminate a different area, and are difficult to maintain when the light source burns out or experiences other electrical problems.

Several solutions have been proposed involving a light source which is bolted, screwed, or otherwise fastened to the visual flow indicator or the sight flow indicator by a fastener which passes through a light source mounting apparatus and into visual flow indicator or sight flow indicator. Once fastened in place, the light source can be removed by un-fastening the light source mounting apparatus in order to repair or replace the light source, or in the event the operator needs to move the light source to a different position. This also requires that the equipment contain a series of different screw holes or other areas to which the light source mounting apparatus can be fastened as the light source is moved from one position to another.

There is therefore a need for an article that can quickly mount a light source to a visual flow indicator or sight flow indicator without the use of added bolts, screws, or other fasteners. By eliminating the need for added bolts, screws, or other fasteners, the light source can be easily moved from one position to another in order to illuminate different areas on the apparatus in question, or to repair or replace the light source.

SUMMARY

The specification discloses an article of manufacture that comprises a housing (100) having a housing first end (110), a housing second end (120) opposite the housing first end, a housing longitudinal axis (130) running from the housing first end to the housing second end, a housing outer surface (140), and a housing first end access (160) from the housing first end to a cavity (150); and a first wing (200) attached to and extending from the housing outer surface in a first direction and having a first wing width (220), wherein a first degree of curvature ($\theta_1$) which can be formed by the first wing is greater than 12° for a one inch first arc length ($A_1$), and the housing has a visible light transmittance in a range of between 10% and 100% along at least one line perpendicular to the housing longitudinal axis to at a point on the housing outer surface.

It is further discloses that the article of manufacture further comprise a second wing (300) attached to and extending from the housing outer surface in a second direction opposite the first direction and having a second wing width (320) and it is possible that there is a second degree of curvature ($\theta_2$) which can be formed by the second wing is greater than 12° for a one inch second arc length ($A_2$).

It is also disclosed that the housing may have a curved outer surface forming a cylindrical profile.

It is also disclosed that the cavity may not extend all the way to the housing second end.

It is alternatively disclosed that the housing may further comprise a housing second end access, and the cavity extends from the housing first end to the housing second end.

The article may further benefit from a shield a shield (600) wrapping around at least a portion of the housing outer surface, and having a shield first end (610), a shield second end (620) opposite the shield first end, and a shield longitudinal axis (630). The shield longitudinal axis may optionally be parallel to or substantially parallel to the housing longitudinal axis.

It is further disclosed that the housing of the article of manufacture may have a housing length dimension, the shield having a shield length dimension, and the housing length dimension is equal to or substantially equal to the shield length dimension such that the housing first end is aligned with the shield first end and the housing second end is aligned with the shield second end.

It is further disclosed that the shield may be opaque.

The light source (400) may be further disposed within the cavity and the light source should be connected to a power source.

The specification further discloses an alternative embodiment with a base with the: housing (100) having a housing first end (110), a housing second end (120) opposite the housing first end, a housing longitudinal axis (130) running from the housing first end to the housing second end, a housing outer surface (140), and a housing first end access (160) from the housing first end to a cavity (150); and a base (180) having a base end (182) and an end opposite of the base end is attached to at least a portion of the housing outer surface; a first wing (200) attached to and extending from the base in a first direction and having a first wing width (220), wherein a first degree of curvature ($\theta_1$) which can be formed by the first wing is greater than 12° for a one inch first arc length ($A_1$), and the housing has a visible light transmittance in a range of between 10% and 100% along at least one line perpendicular to the housing longitudinal axis to at a point on the housing outer surface.

The alternative embodiment with a base may also further comprise a second wing (300) attached to and extending from the base in a second direction opposite the first direction and having a second wing width (320).

The alternative embodiment with the base and second wing may also have a second degree of curvature ($\theta_2$) which can be formed by the second wing is greater than 12° for a one inch second arc length ($A_2$).

The housing of the alternative embodiment may have a curved outer surface forming a cylindrical profile.

It is conceived that the cavity of the alternative embodiment does not extend all the way to the housing second end or the housing may have a housing second end access, and the cavity extends from the housing first end to the housing second end.

The article of manufacture of any of claims 13 to 18, further comprising a shield (600) wrapping around at least a portion of the housing outer surface, and having a shield first end (610), a shield second end (620) opposite the shield first end, and a shield longitudinal axis (630).

The article of manufacture of claim 19, wherein the shield longitudinal axis is parallel to or substantially parallel to the housing longitudinal axis.

The article of manufacture of any of claims 19 to 20, wherein the housing has a housing length dimension, the shield has a shield length dimension, and the housing length dimension is equal to or substantially equal to the shield length dimension such that the housing first end is aligned with the shield first end and the housing second end is aligned with the shield second end.

The article of manufacture of any of claims 19 to 21, wherein the shield is opaque.

The article of manufacture of any of claims 13 to 22, further comprising a light source (400) is disposed within the cavity.

The article of manufacture of claim 23, wherein the light source is connected to a power source (500).

It is also disclosed that these various components may come as a kit comprising: an article of manufacture comprising a housing (100), and a first wing (200); and a light source (400).

This kit may further comprise a shield, and/or power source, and/or a base, and/or a second wing.

DETAILED DESCRIPTION

Figure 1:
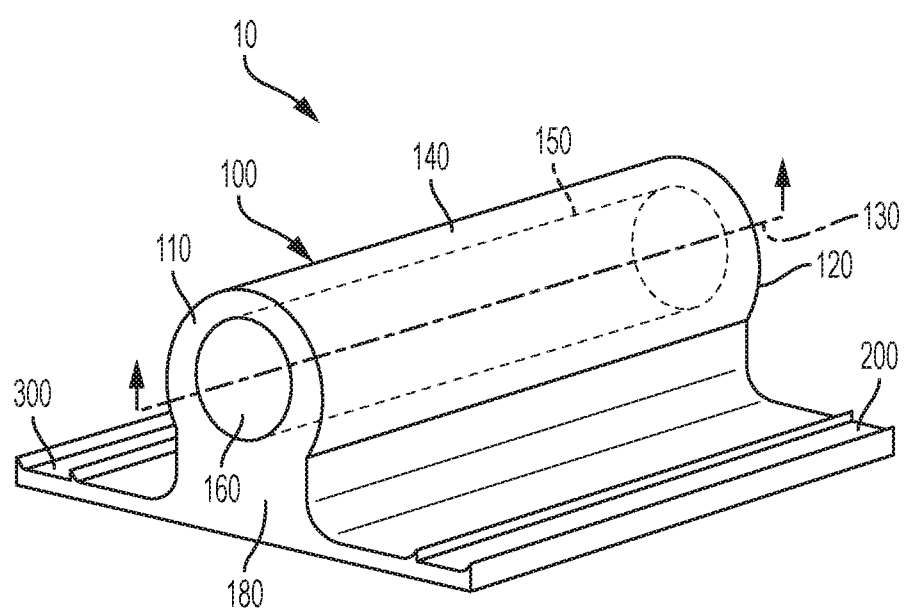
FIG. 1 is a perspective view of an article of manufacture as described herein.

This specification is best understood by referring to FIG. 1, which is a detailed drawing of the invented article. Reference will now be made to the various Figures in which, unless otherwise noted, like numbers refer to like structures. As described herein and in the claims, the following numbers refer to the following structures as noted in the Figures.

10 refers to the article of manufacture.
100 refers to a housing.
110 refers to a housing first end.
120 refers to a housing second end.
130 refers to a housing longitudinal axis.
140 refers to a housing outer surface.
150 refers to a cavity.
160 refers to a housing first end access.
170 refers to a housing center line.
180 refers to a base.
182 refers to a base end.
185 refers to a base height dimension.
187 refers to a base width dimension.
200 refers to a first wing.
210 refers to a first wing end.
220 refers to a first wing width dimension.
230 refers to a first wing height dimension.
240 refers to a first wing length dimension.
250 refers to a first wing rib.
260 refers to a first wing attachment point.
300 refers to a second wing.
310 refers to a second wing end.
320 refers to a second wing width dimension.
330 refers to a second wing height dimension.
340 refers to a second wing length dimension.
350 refers to a second wing rib.
360 refers to a second wing attachment point.
400 refers to a light source.
500 refers to a power source.
600 refers to a shield.
610 refers to a shield first end.
620 refers to a shield second end.
630 refers to a shield longitudinal axis.
700 refers to a tube.
710 refers to a mounting bolt.
720 refers to a tube center point.
$\theta_1$ refers to a first degree of curvature.
$\theta_2$ refers to a second degree of curvature.
$A_1$ refers to a first arc length.
$A_2$ refers to a second arc length.
$r_1$ refers to a first radius.
$r_2$ refers to a first radius.

FIG. 1 depicts the article of manufacture (10) comprising a housing (100) having a housing first end (110) and a housing second end (120) opposite the housing first end. There is a housing longitudinal axis (130) running from the housing first end to the housing second end. The housing also has a housing outer surface (140) which is a surface at the exterior of the housing running from the housing first end to the housing second end.

The housing outer surface may be parallel or substantially parallel to the housing longitudinal axis. In some embodiments, the housing outer surface may not be parallel to the housing longitudinal axis. For example, the housing outer surface may angle inward or outward relative to the housing longitudinal axis as the housing outer surface extends from the housing first end to the housing second end. In another example, the housing outer surface may angle inward and then outward or outward and then inward relative to the housing longitudinal axis as the housing outer surface extends from the housing first end to the housing second end. In some embodiments, the housing outer surface may comprise a surface modification on at least a portion of the housing outer surface. Examples of surface modifications include ridges, grooves, dimples, and combinations thereof.

While FIG. 1 shows the housing having a curved outer surface such that the housing forms a cylindrical profile, one of ordinary skill will readily understand that the outer surface profile can be modified to different shapes. Examples of such outer surface profiles may include a square profile, a heptagonal profile, a hexagonal profile, an octagonal profile, a trapezoidal profile and the like.

FIG. 1 also shows a cavity (150) in the housing. Preferably, the cavity will originate from a housing first end access (160), which is an aperture located at the housing first end (110). The cavity may be parallel to or substantially parallel to the housing longitudinal axis (130). In some embodiments, the cavity may be angled relative to the housing longitudinal axis.

The cavity (150) may extend all the way from the housing first end (110) to the housing second end (120). In such embodiments, there will be a housing second end access, which is an aperture located at the housing second end. In other embodiments, the cavity will not extend all the way from the housing first end to the housing second end. In such embodiments, the cavity will extend along a portion of the housing length dimension, but there will not be a housing second end access. Embodiments may also exist where the cavity will originate from the housing second end access, and will not extend all the way from the housing second end to the housing first end. In such embodiments, the cavity will extend along a portion of the housing length dimension, but there will not be a housing first end access.

In some embodiments, such as that shown in FIG. 1, the housing will be attached to a base (180). The base, when utilized, will extend from a portion of the housing outer surface (140) to join to a top surface of one or both of the first wing (200) and/or the second wing (300).

FIG. 1 also shows a first wing (200) and a second wing (300). As shown in FIG. 1, the first wing is attached to and extends from the base (180) in a first direction while the second wing is attached to and extends from the base in a second direction opposite of the first direction. The second wing is not considered necessary, and there may be embodiments having only one wing.

Figure 2:
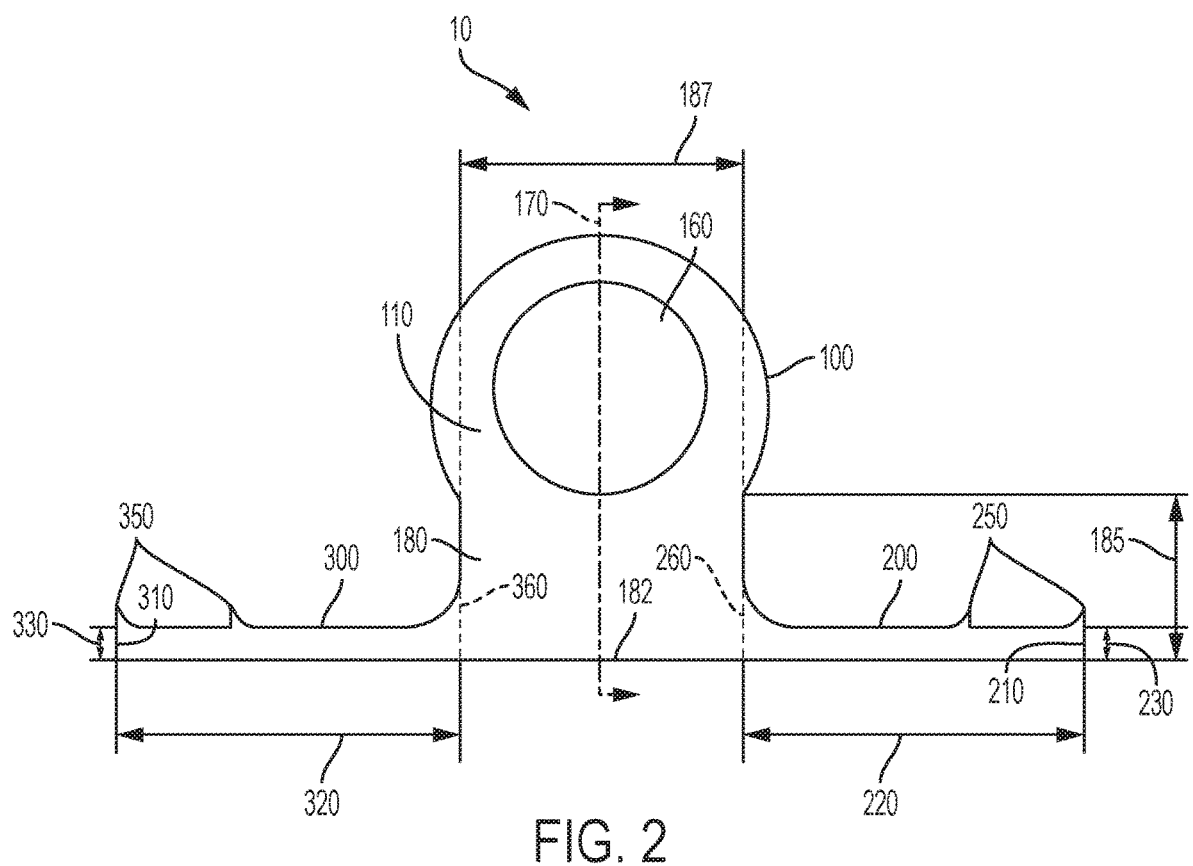
FIG. 2 is an end view of the article of manufacture of FIG. 1.

FIG. 2 shows an end view of the article from the housing first end (110). As shown in FIG. 2, the base (180), when utilized, has a base end (182). The base also has a base height dimension (185) which is the distance from the base first end to the portion of the housing outer surface that the base extends from. The base height dimension is measured perpendicularly from the housing longitudinal axis. The base also has a base width dimension (187). The base width dimension is measured perpendicularly from the base height dimension. The actual measurement of the base height dimension and the base width dimension are not considered important, and may vary for different applications.

FIG. 2 also shows the housing (100) having a housing center line (170). The housing center line runs down the middle of the housing tangent to the housing longitudinal axis. Preferably, a center point of the access to the cavity will lie on the housing center line, however, embodiments may exist where the center point of the access to the cavity will not lie on the housing center line.

As shown in FIG. 2, the first wing (200) has a first wing end (210), a first wing width dimension (220), and a first wing height dimension (230). The first wing width dimension is measured from the first wing attachment point (260) to the first wing end (230). In embodiments where the article comprises a base (180), the first wing attachment point will be the point at which the first wing attaches to the base. In embodiments where the article does not comprise a base, the first wing attachment point will be the point at which the first wing attaches to the housing (100). The first wing height dimension is perpendicular to the housing longitudinal axis. FIG. 2 also shows the first wing optionally having at least one first wing rib (250).

Similarly, the second wing (300), when used, has a second wing end (310), a second wing width dimension (320), and a second wing height dimension (330). The second wing width dimension is measured from the second wing attachment point (360) to the second wing end (330). In embodiments where the article comprises a base (180), the second wing attachment point will be the point at which the second wing attaches to the base. In embodiments where the article does not comprise a base, the second wing attachment point will be the point at which the second wing attaches to the housing (100). The second wing height dimension is perpendicular to the housing longitudinal axis. FIG. 2 also shows the second wing optionally having at least one second wing rib (350).

The first wing width dimension (220) may be equal to or substantially equal to the second wing width dimension (320). However, in some embodiments, the first wing width dimension may be greater than or less than the second wing width dimension.

The first wing height dimension (230) may be equal to or substantially equal to the second wing height dimension (330). However, in some embodiments, the first wing height dimension may be greater than or less than the second wing height dimension.

Figure 3:
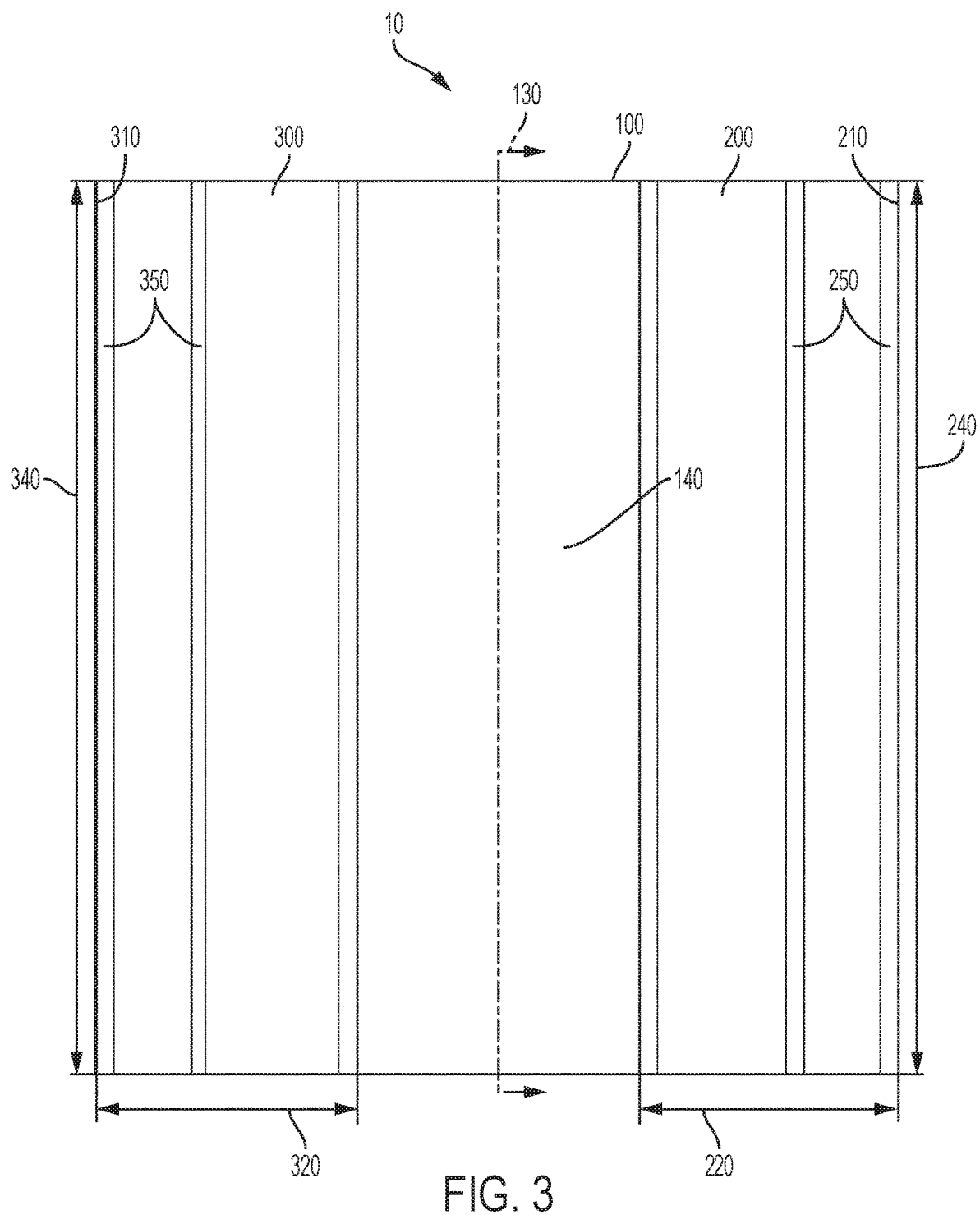
FIG. 3 is a top view of the article of manufacture of FIG. 1.

FIG. 3 shows a top view of the article of manufacture. As shown in FIG. 3, the first wing (200) will have a first wing length dimension (240) measured along an edge corresponding to the first wing end (210). The first wing length dimension may be parallel to or substantially parallel to the housing longitudinal axis (130). Similarly, the second wing (300) will have a second wing length dimension (340) measured along an edge corresponding to the second wing end (310). The second wing length dimension may be parallel to, or substantially parallel to the housing longitudinal axis.

The first wing length dimension (240) may be equal to or substantially equal to the second wing length dimension (340). However, in some embodiments, the first wing length dimension may be greater than or less than the second wing length dimension. While FIG. 3 shows the first wing length dimension and the second wing length dimension both being equal to the housing length dimension, either or both of the first wing length dimension and the second wing length dimension may be greater than or less than the housing length dimension.

In some embodiments, one or both of the first wing (200) and/or the second wing (300) may include one or more perforation. When the first wing includes one or more perforation, each perforation may extend substantially parallel to or parallel to the first wing length dimension (240). Similarly, when the second wing includes one or more perforation, each perforation may extend substantially parallel to or parallel to the second wing length dimension (340). The perforation(s) when present, provide a mechanism for shortening the respective wing width dimension to allow for adaptations of the wing width dimensions to fit different applications.

Figure 4:
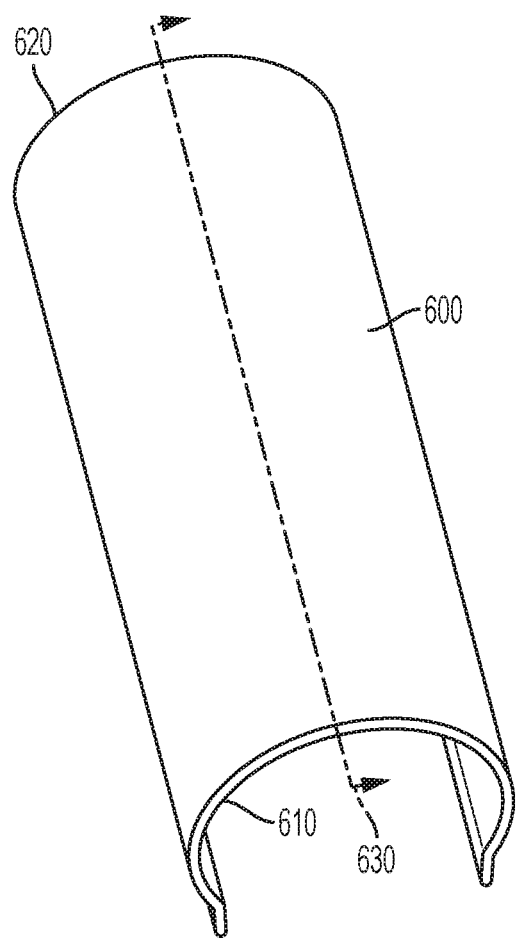
FIG. 4 is a perspective view of a shield as described herein.

FIG. 4 shows a perspective view of a shield (600). The shield has a shield first end (610), a shield second end (620) opposite the shield first end, and a shield longitudinal axis (630) running from the shield first end to the shield second end. The shield is preferably opaque which may occur either through manufacturing the shield from an opaque material or from placing an opaque coating, paint, or the like over or around the shield.

The shield is preferable stiffer than the wings as it is used in part to block light as well as to protect the light source in an industrial setting.

Figure 5:
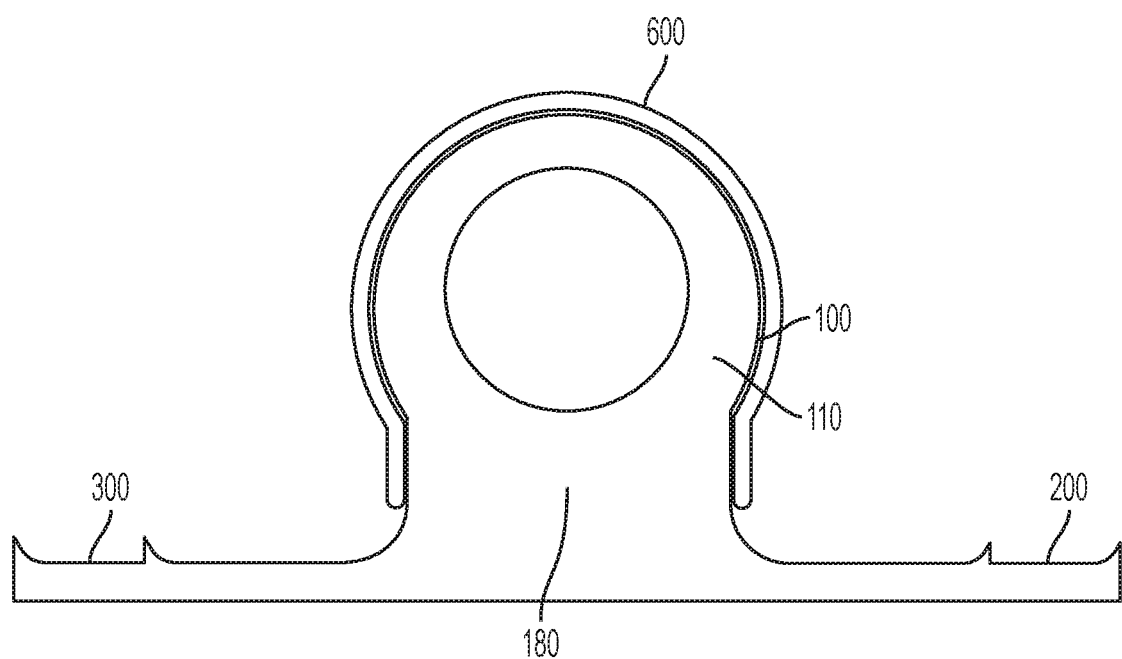
FIG. 5 is an end view of a shield installed on an article of manufacture as described herein.

FIG. 5 shows an end view of a shield (600) installed on an article of manufacture. As shown, the shield wraps around the housing (100), and optionally a portion of the base (180).

When installed, the shield longitudinal axis (630) may be parallel to or substantially parallel to the housing longitudinal axis (130). In a preferred embodiment, the shield will have a shield length dimension which is the same length as the housing such that the shield first end (610) is aligned with or substantially aligned with the housing first end (610) and the shield second end (620) is aligned with or substantially aligned with the housing second end (120). In some alternative embodiments, the shield length dimension may be less than or greater than the housing length dimension. In one embodiment, the shield conforms to the shape of the housing outer surface and is engaged with the housing outer surface.

Figure 6:
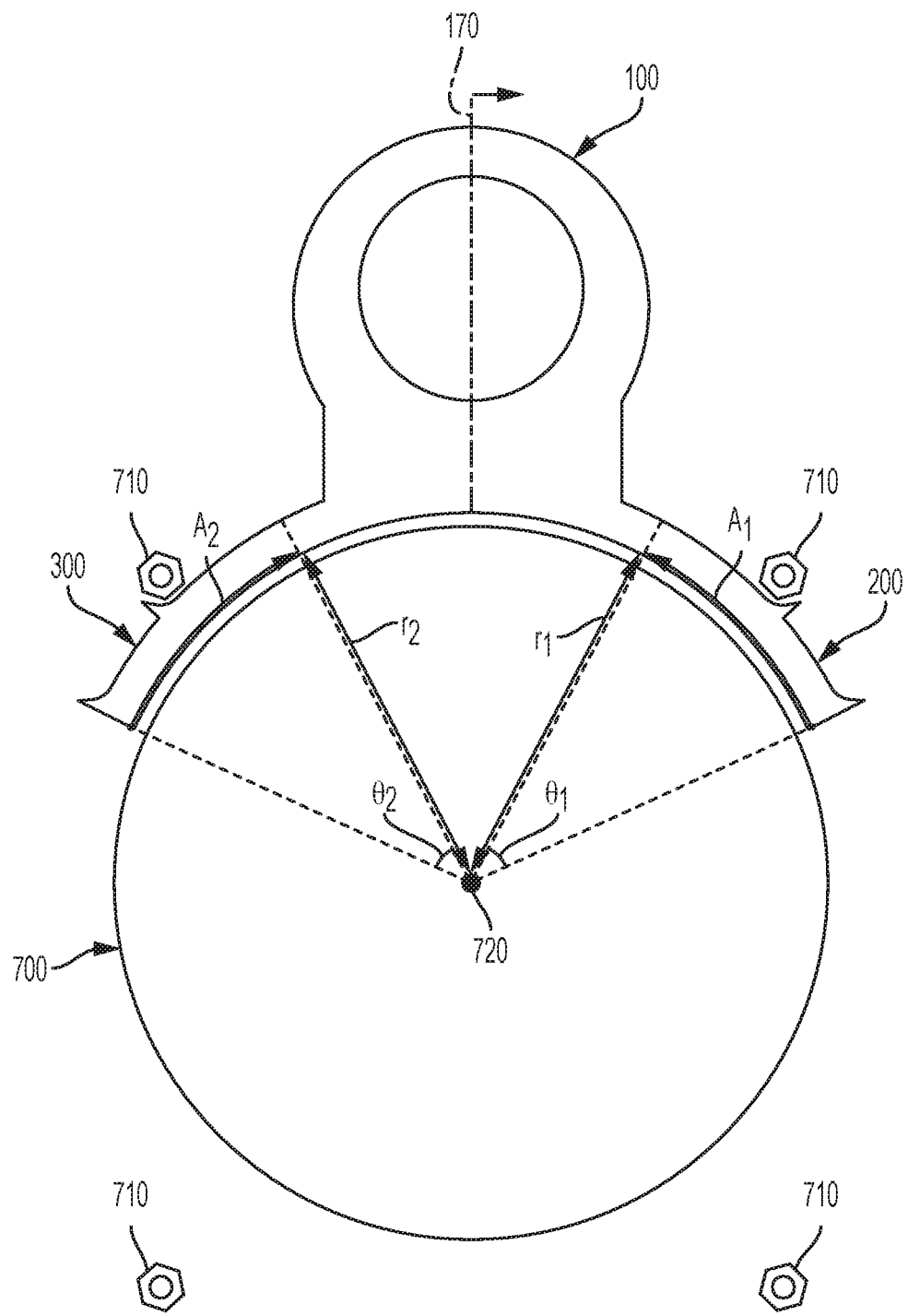
FIG. 6 is an end view of an article of manufacture wrapped partially around a tube.
Figure 7:
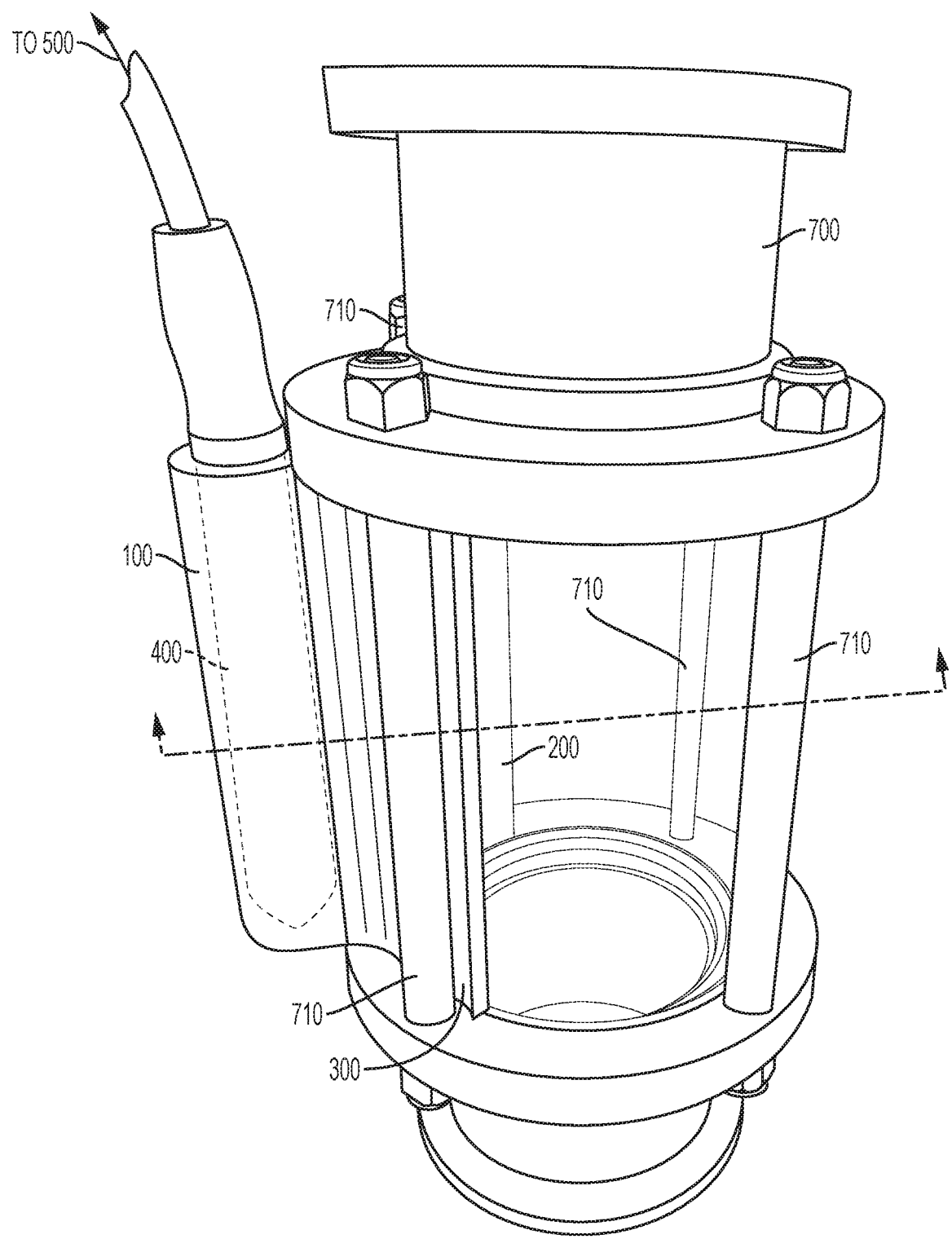
FIG. 7 is a perspective view of an article of manufacture in use wrapped around a tube with a light source installed in the article of manufacture.

FIG. 6 shows an end cap view of the article of manufacture wrapped at least partially around a tube (700). The article may be held in place around the tube by one or more bolts (710). Preferably, the article will be held in place by two consecutive bolts in a plurality of bolts. It should be noted that—as shown in FIG. 7—the bolts do not pass through the housing, the optional base, or either of the wings; but instead are part of the existing device and are used to trap the wing(s) between the bolt and the tube.

The plurality of bolts (710) may comprise any number of bolts, with traditional embodiments including four bolts as shown in FIG. 6. In some embodiments, there may be six bolts. In any event, it is preferred that there are at least two bolts, and that the article is held in place by at least two consecutive bolts of the plurality of bolts. By consecutive bolts it is meant that, as one proceeds clockwise around the tube when viewed from an end as shown in FIG. 6, the first bolt of the two consecutive bolts will be followed by the second bolt without an additional bolt being between the first bolt and the second bolt. As an example, in FIG. 6, the bolt in the upper left corner and the bolt in the upper right corner would constitute two consecutive bolts, while the bolt in the upper left corner and the bolt in the lower right corner would not constitute two consecutive bolts because they are separated by the bolt in the upper right corner and the bolt in the lower left corner. The bolt in the upper left corner and the bolt in the lower right corner would be considered opposing bolts, as would the bolt in the upper right corner and the bolt in the lower left corner.

In embodiments comprising only a first wing (200)—i.e. embodiments where a second wing is not present—the first wing may be held in place by only a single bolt of the one or more bolts (710).

FIG. 6 also shows a first degree of curvature ($\theta_1$) formed by the first wing (200) and a second degree of curvature ($\theta_2$) formed by the second wing (300). The first degree of curvature and the second degree of curvature can each be measured according to the formula $$r = \frac{180A}{\pi D_A}$$

where r is the radius of curvature ($r_1$ for the first wing and $r_2$ for the second wing), A is the arc length ($A_1$ for the first wing and $A_2$ for the second wing), and $D_A$ is the degree of curvature ($\theta_1$ for the first wing and $\theta_2$ for the second wing). As shown in FIG. 6, the first wing arc length ($A_1$) is measured starting from the first wing end (230). Similarly, the second wing arc length ($A_2$) is measured starting from the second wing end (330).

The first degree of curvature ($\theta_1$) formed by the first wing (200) may be greater than 12°, greater than 18°, greater than 25°, greater than 50°, or greater than 100° for a one inch first wing arc length ($A_1$). Similarly, the second degree of curvature ($\theta_2$) formed by the second wing (300) may be greater than 12°, greater than 18°, greater than 25°, greater than 50°, or greater than 100° for a one inch second wing arc length ($A_2$).

Preferably, one or both of the first wing (200) and the second wing (300) will be made of a deformable material. By deformable material, it is meant that the wing may be bent around a tube when held in place by two consecutive bolts of the series of bolts without breaking. For purposes of the invention, breaking may be defined by the complete separation of a wing or portion thereof from the housing or base and/or the development of a crack or fracture at some point on a wing. In some embodiments, it may be beneficial, though not required, that the material have a memory. By a memory it is meant that the wings will substantially return to their original position—i.e. the wing position before the wing was wrapped around a tube or pipe—when released from the tube or pipe.

Preferably, the first wing (200)—and the optional second wing (300) may be bent to their respective degree of curvature without breaking. Breaking of a wing may be indicated by the complete removal of all or a portion of the respective wing from the article, or by the presence of a crack or fracture at some point on the respective wing. The deformability of the wings may be affected by a number of different variables including the value of the wing length dimension, the value of the wing height dimension, the value of the wing width dimension, and the material of construction used to form the wing(s), the housing, and the optional base. Preferred material of construction for the wing(s) include rubber, silicone, and plastics. Preferably, the wings, the housing, and the optional base will be made of the same materials of construction such that all of the components can be made of a unitary construction as in injection molding.

FIG. 7 shows a perspective view of the article of manufacture wrapped around a tube (700) and held in place by two consecutive bolts (710) of a series of bolts. The tube may represent a visual flow indicator or sight flow indicator. In the example shown in FIG. 7, the second wing (300) is held in place around the tube by the bolt (710) facing the viewer on the left side while the first wing (200) is held in place by the next bolt (710) in line when moving around the tube in a clockwise direction.

Also shown in FIG. 7 is a light source (400). The light source may be connected to a power source (500), such as a battery or a standard wall outlet. The light source is preferably disposed within the cavity as shown in FIG. 7. The light source may serve to illuminate the contents of the tube, and/or an area outside of and adjacent to the tube. Preferably, the housing, wings, and optional base are made of a transparent or substantially transparent material having a visible light transmittance. The visible light transmittance may be in a range of between 10% and 100%, between 25% and 100%, or between 50% and 100% along at least one line perpendicular to the housing longitudinal axis to a point on the housing outer surface. Because perpendicular lines intersect each other at 90°, this can also be explained as the visible light transmittance of light traveling along the path starting from the housing longitudinal axis, traveling perpendicular to the housing longitudinal axis to a point on the housing outer surface. Recognizing that the thickness of the housing may vary, there need be only one path falling within the range of light transmittance, thus the limitation of "a point", as long as there is at least one point where the light transmittance is in the specified range.

Figure 8:
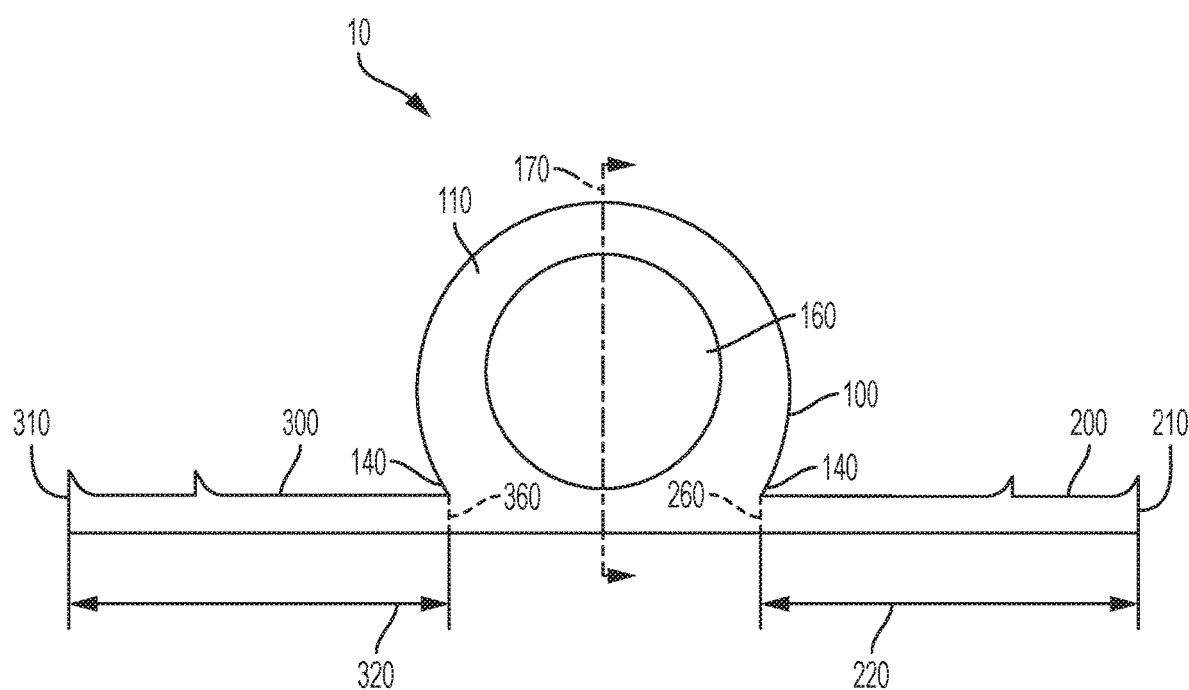
FIG. 8 is an end view of an article of manufacture having no base.

FIG. 8 shows an embodiment where the article does not comprise a base. In such an embodiment, the first wing and the second wing will be attached directly to the housing. In such embodiments, the first wing may be attached to and extend from the housing outer surface (140) in a first direction while the second wing is attached to and extends from the housing outer surface in a second direction opposite of the first direction.

The various components described herein may also be provided in the form of a kit. The kit may comprise an article of manufacture (10) comprising a housing (100), and a first wing (200); and a light source (400). In some embodiments, the kit may also comprise a shield (600). In some embodiments, the kit may also comprise a power source (500). In some embodiments, the article of manufacture provided in the kit may comprise a base (180). In some embodiments, the article of manufacture provided in the kit may further comprise a second wing (300).

What is claimed is:

1. An article of manufacture comprising:
   a housing having a housing first end, a housing second end opposite the housing first end, a housing longitudinal axis running from the housing first end to the housing second end, a housing outer surface, a housing center line, and a housing first end access from the housing first end to a cavity;
   a first wing attached to and extending from the housing outer surface in a first direction and having a first wing width; and
   wherein the first wing is made of a deformable material configure to form a first degree of curvature for the first wing said first degree of curvature arcing away from the housing and being greater than 12° for a one inch (2.54 cm) first arc length of a first arc of a circle with the first arc formed by a side of the first wing opposite the cavity wherein said circle has a center point on the housing center line and the circle does not encompass the housing; and
   wherein the housing has a visible light transmittance in a range of between 10% and 100% along at least one line perpendicular to the housing longitudinal axis to a point on the housing outer surface and into the circle.

2. The article of manufacture of claim 1, further comprising a second wing attached to and extending from the housing outer surface in a second direction opposite the first direction and having a second wing width.

3. The article of manufacture of claim 2, wherein the second wing is made of a deformable material configure to form a second degree of curvature for the second wing wherein the second degree of curvature is greater than 12° for a one inch (2.54 cm) second arc length.

4. The article of manufacture of claim 1, wherein the cavity does not extend all the way to the housing second end.

5. The article of manufacture of claim 1, wherein the housing further comprises a housing second end access, and the cavity extends from the housing first end to the housing second end.

6. The article of manufacture of claim 1, further comprising a shield wrapping around at least a portion of the housing outer surface, said shield having a shield first end, a shield second end opposite the shield first end, and a shield longitudinal axis.

7. The article of manufacture of claim 6, wherein the shield longitudinal axis is parallel to or substantially parallel to the housing longitudinal axis, and the housing has a housing length dimension, the shield has a shield length dimension, and the housing length dimension is equal to or substantially equal to the shield length dimension such that the housing first end is aligned with the shield first end and the housing second end is aligned with the shield second end.

8. The article of manufacture of claim 6, wherein the shield is opaque.

9. The article of manufacture of claim 1, further comprising a light source disposed within the cavity.

10. An article of manufacture comprising:
    a housing having a housing first end, a housing second end opposite the housing first end, a housing longitudinal axis running from the housing first end to the housing second end, a housing outer surface, a housing center line, and a housing first end access from the housing first end to a cavity;
    a base having a base end and an end opposite of the base end is attached to at least a portion of the housing outer surface;
    a first wing attached to and extending from the base in a first direction and having a first wing width;
    and wherein the first wing is made of a deformable material configure to form a first degree of curvature for the first wing said first degree of curvature arcing away from the housing and being greater than 12° for a one inch (2.54 cm) first arc length of a first arc of a circle with the first arc formed by a side of the first wing opposite the cavity wherein said circle has a center point on the housing center line and the circle does not encompass the housing; and
    wherein the housing has a visible light transmittance in a range of between 10% and 100% along at least one line perpendicular to the housing longitudinal axis to a point on the housing outer surface and into the circle.

11. The article of manufacture of claim 10, further comprising a second wing attached to and extending from the base in a second direction opposite the first direction and having a second wing width.

12. The article of manufacture of claim 11, wherein the second wing is made of a deformable material configure to form a second degree of curvature for the second wing wherein the second degree of curvature is greater than 120 for a one inch (2.54 cm) second arc length.

13. The article of manufacture of claim 10, wherein the cavity does not extend all the way to the housing second end.

14. The article of manufacture of claim 10, wherein the housing further comprises a housing second end access, and the cavity extends from the housing first end to the housing second end.

15. The article of manufacture of claim 10, further comprising a shield wrapping around at least a portion of the housing outer surface, said shield having a shield first end, a shield second end opposite the shield first end, and a shield longitudinal axis.

16. The article of manufacture of claim 15, wherein the shield longitudinal axis is parallel to or substantially parallel to the housing longitudinal axis, and the housing has a housing length dimension, the shield has a shield length dimension, and the housing length dimension is equal to or substantially equal to the shield length dimension such that the housing first end is aligned with the shield first end and the housing second end is aligned with the shield second end.

17. The article of manufacture of claim 15, wherein the shield is opaque.

18. The article of manufacture of claim 10, further comprising a light source is disposed within the cavity.

* * * * *